(12) United States Patent
Richmond et al.

(10) Patent No.: US 6,318,294 B1
(45) Date of Patent: Nov. 20, 2001

(54) ANIMAL SHELTER

(75) Inventors: Edward A. Richmond, Encino; Gregory M. Richmond, Los Angeles, both of CA (US)

(73) Assignee: Amerlin, Inc., N. Hollywood, CA (US)

( * ) Notice: Subject to any disclaimer, the term of this patent is extended or adjusted under 35 U.S.C. 154(b) by 0 days.

(21) Appl. No.: 09/557,634

(22) Filed: Apr. 25, 2000

(51) Int. Cl.[7] ................................................. A01K 1/02
(52) U.S. Cl. ................................................................. 119/482
(58) Field of Search ..................... 119/428, 429, 119/431, 459, 461, 472, 474, 482, 491, 498, 504, 513

(56) References Cited

U.S. PATENT DOCUMENTS

| | | | |
|---|---|---|---|
| D. 327,143 | * 6/1992 | Dickinson | 119/16 |
| 3,129,693 | * 4/1964 | Vore . | |
| 3,730,139 | * 5/1973 | Moore . | |
| 5,964,189 | * 10/1999 | Northrop et al. | 119/482 |

* cited by examiner

Primary Examiner—Thomas Price

(74) Attorney, Agent, or Firm—Fulwider Patton, et al.; Ellsworth R. Roston

(57) ABSTRACT

A plurality of panels preferably made from a heat insulating material define an enclosure for a pet shelter. One of the panels has an opening for the pet to enter or exit the enclosure. The panels are disposed on a base member. Detents (e.g. hooks) on the panels are removably disposed in detents (e.g. openings) in the base member to position the panels in a particular relationship on the base member. The panels may be integral with one another or may be separate. When separate, the panels may be tilted inwardly to dispose the ends of adjacent pairs of the panels in a contiguous relationship. After being tilted, the panels are joined by locking rails, each engaging the contiguous ends of a different pair of adjacent panels and each removable to disengage the panels. A top cap on the panels defines a roof for the enclosure. When the panels are integral with each other, the top cap may be integral with the panels. When the panels are separate, detents on the top cap are removably coupled to detents on the panels, with the panels tilted, to position the top cap on the panels, thereby providing for easy assembly on, or disassembly from, the panels. The top cap has an opening to receive a vent cap. Whether the flaps are integral or separate, the vent cap is slidable in the opening in the top cap to adjust the size of a passage through which air circulates into and out of the enclosure.

48 Claims, 5 Drawing Sheets

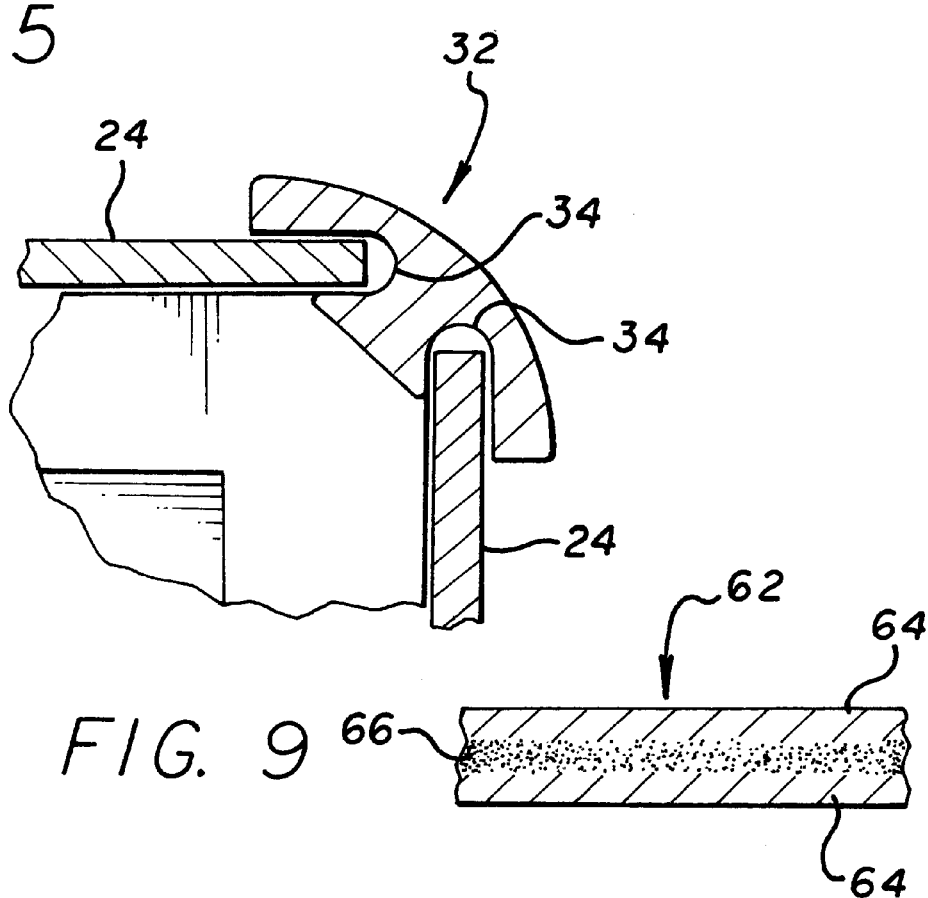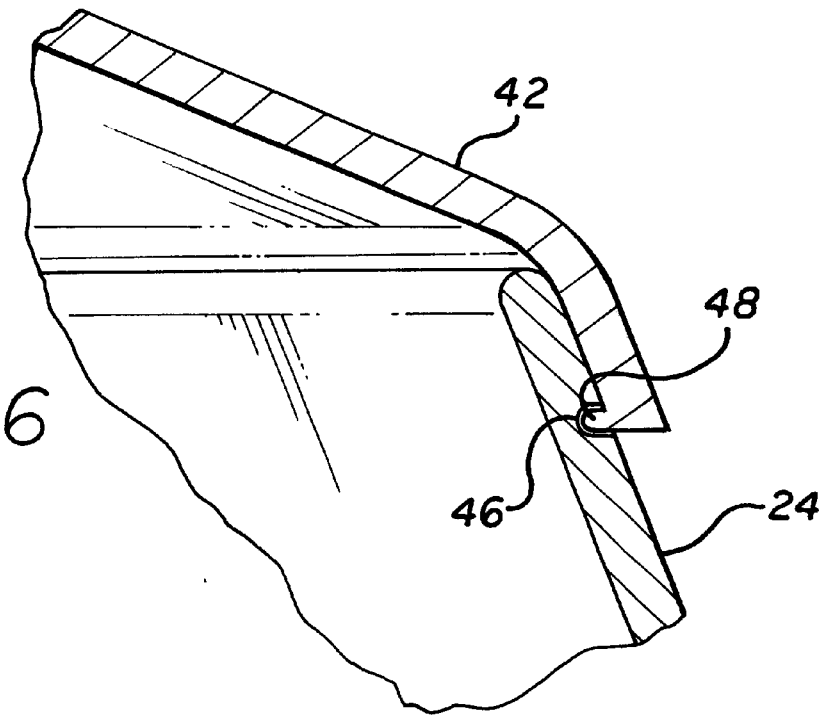

ANIMAL SHELTER

This invention relates to pet shelters. The invention particularly relates to pet structures which provide optimal comfort to pets housed within the pet shelter. The invention also relates to pet shelters which can be stored in a compact disassembled form and which can be easily assembled and subsequently disassembled.

BACKGROUND OF THE INVENTION

Most of the families in the United States own at least one (1) pet. The average per family approaches two (2) pets. Many of these families treat their pets almost as members of the families. Many of these families treat their pets almost as another child or children in the families. They lavish love and attention on their pets. They spend a considerable amount of money annually in caring for their pets. Pets are especially important to aging individuals since these individuals often live by themselves. The individuals talk to the pets almost as if the pets were human.

In spite of the love and attention devoted to their pets, the pets in many families sleep in pet shelters outdoors. This presents problems. The pets are not sheltered from the weather i.e., rain, snow, heat and cold. The pets suffer from an inadequate circulation of air inside the enclosure defining the pet shelter. The pet shelters are not comfortable.

The pet shelters now in use are large and bulky. For example, the pet shelters are so large that they cannot fit into automobiles or even into utility vehicles. When the families move from one location to another, the pet shelters cannot be easily dissembled at the first location and re-assembled at the second location. In many instances, the pet shelters cannot even be disassembled. Even when they can be disassembled, they cannot be disassembled for storage in a compact storage space.

The problems discussed in the previous paragraph with respect to pets have been known for some time to exist. Furthermore, the problems have been known by a significant percentage of the population in the outer states. In spite of the opportunity of this large number of people to resolve the problems discussed in the previous paragraphs, the problems still exist.

BRIEF DESCRIPTION OF THE PREFERRED EMBODIMENT

In preferred embodiments of the invention, a plurality of panels preferably made from a heat insulating material define an enclosure for a pet shelter. One of the panels has an opening for the pet to enter or exit the enclosure. The panels are disposed on a base member. Detents (e.g. hooks) on the panels are removably disposed in detents (e.g. openings) in the base member to position the panels in a particular relationship on the base member. The panels may be integral with one another or may be separate. When separate, the panels may be tilted inwardly to dispose the ends of adjacent pairs of the panels in a contiguous relationship. After being tilted, the panels are joined by locking rails, each engaging the contiguous ends of a different pair of adjacent panels and each removable to disengage the panels. A top cap on the panels defines a roof for the enclosure. When the panels are integral with each other, the top cap may be integral with the panels. When the panels are separate, detents on the top cap are removably coupled to detents on the panels, with the panels tilted, to position the top cap on the panels, thereby providing for easy assembly on, or disassembly from, the panels. The top cap has an opening to receive a vent cap. Whether the flaps are integral or separate, the vent cap is slidable in the opening in the top cap to adjust the size of a passage through which air circulates into and out of the enclosure.

BRIEF DESCRIPTION OF THE DRAWINGS SHOWING THE PREFERRED EMBODIMENT

In the drawings:

FIG. 5 is a sectional view of the preferred embodiment of the pet shelter and is taken substantially on the line 5—5 in FIG. 1;

FIG. 6 is a sectional view of the preferred embodiment of the invention and is taken substantially on the line 6—6 in FIG. 1;

FIG. 9 is an enlarged fragmentary sectional view showing the characteristics of the material used in fabricating the preferred embodiments of the invention shown in FIGS. 1–8 and is taken substantially on the line 9—9 in FIG. 1.

DETAILED DESCRIPTION OF THE PREFERRED EMBODIMENT

Figure 1:
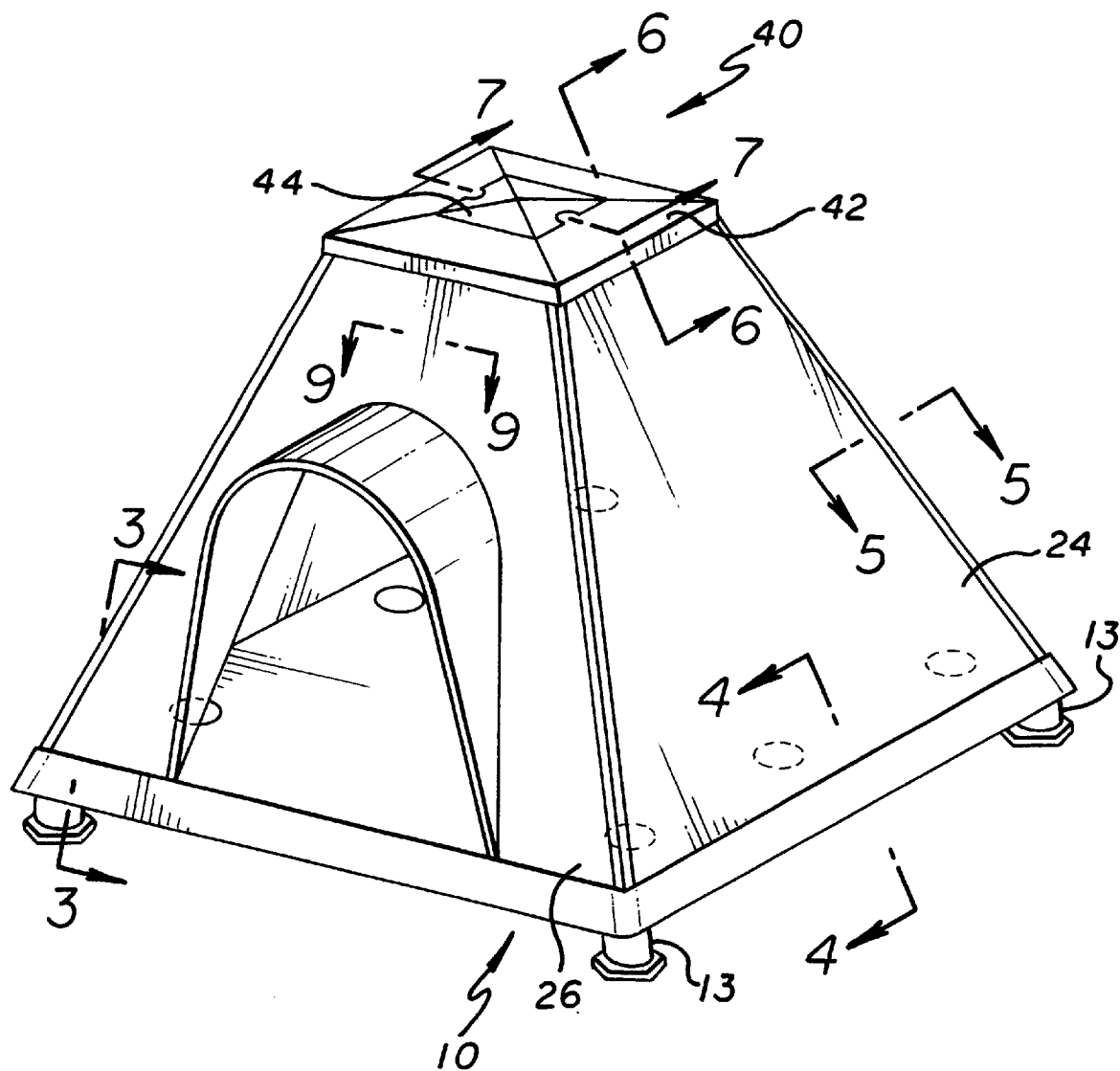
FIG. 1 is a perspective view of a preferred embodiment of a pet shelter as seen from a position in front of, and to the right of, the pet shelter.

As will be seen from the drawings, applicants provide two (2) preferred embodiments of a pet shelter constituting this invention. Both embodiments are meant to be disposed outdoors as in a family's backyard. Both embodiments are made from a material which provides significant insulation against hot and cold temperatures and which protects against unpleasant environmental conditions such as rain, hail and snow. Both embodiments provide for an optimal and adjustable circulation of air through the pet shelters. Both embodiments are comfortable for the pet. Both embodiments provide desirable aesthetic features. Both embodiments are relatively simple in construction.

One embodiment constituting a preferred embodiment is shown in FIGS. 1–7 and is generally indicated at 10. This embodiment includes knock-down features which provide for an easy assembly and disassembly of the pet shelter. This assembly and disassembly can be performed by an individual without any great mechanical ability and without any special training. When disassembled, the components can be stored in a compact space such as in a garage. When disassembled, the parts can be easily transported in an automobile. This is in contrast to embodiments now being manufactured and sold. These embodiments cannot be disassembled. They are so large that they cannot be transported in a majority of the vehicles. They are so large that they occupy valuable storage space in a pet owner's home when not in use.

Figure 8:
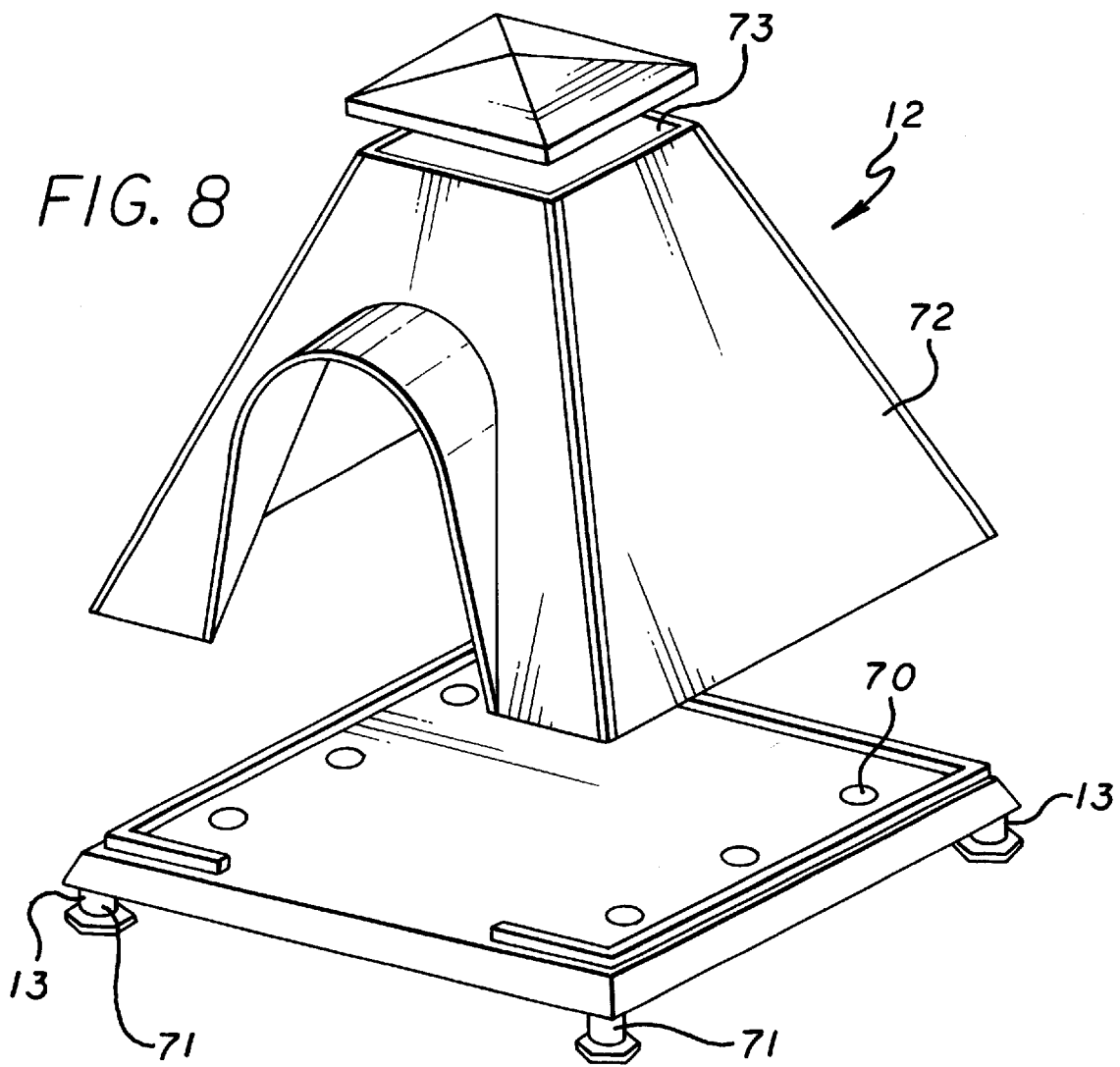
FIG. 8 is a partially exploded perspective view of a second preferred embodiment of the invention and is seen from substantially the same position as the showings in FIGS. 1 and 2.

The other embodiment is generally indicated at 12 in FIG. 8. It is preferred but not as preferred as the embodiment 10. The embodiment 12 is preformed to a considerable extent and, to that extent, cannot be subsequently disassembled. However, it includes some parts which have to be assembled to the pre-formed portion to complete the pet shelter and which can be subsequently disassembled from the pre-assembled portion. The preferred embodiment 12 cannot be as easily transported as the preferred embodiment 10 and cannot be stored in a compact space as can the preferred embodiment 10. For these and other reasons, the embodiment 10 is preferred over the embodiment 12.

Figure 3:
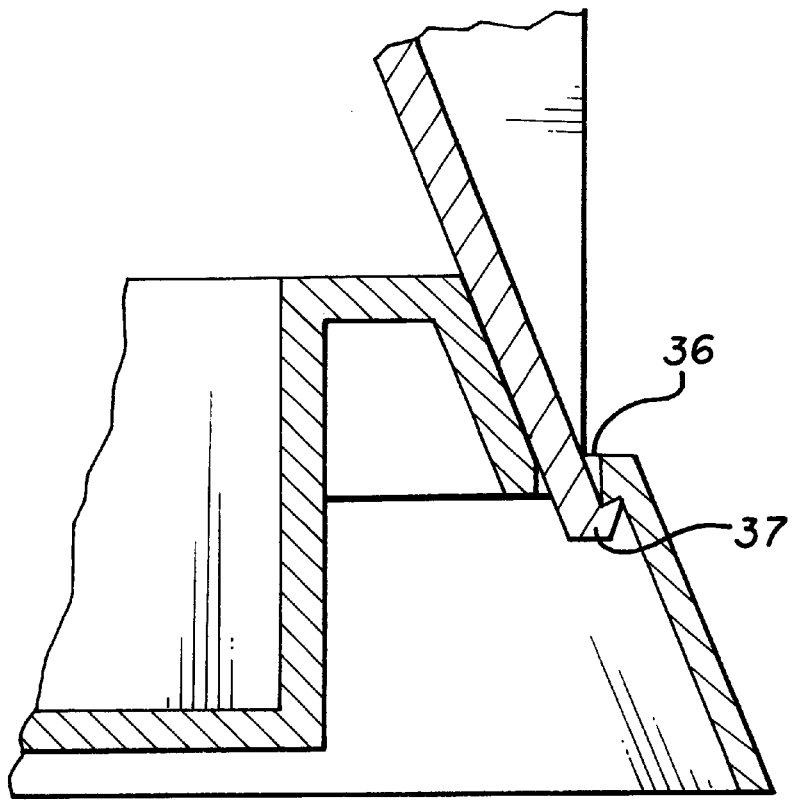
FIG. 3 is a sectional view of the preferred embodiment of the pet shelter and is taken substantially on the line 3—3 in FIG. 1.
Figure 4:
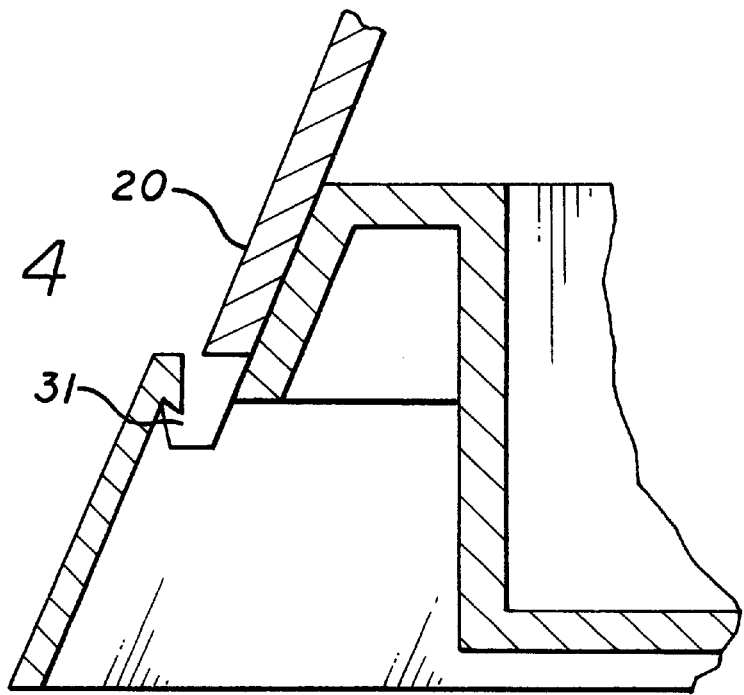
FIG. 4 is a sectional view of the preferred embodiment of the pet shelter and is taken substantially on the line 4—4 in FIG. 1.
Figure 7:
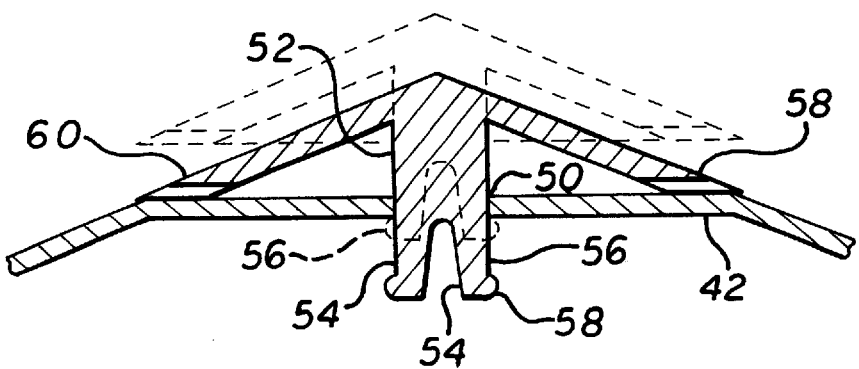
FIG. 7 is a sectional view of the preferred embodiment of the invention and is taken substantially on the line 7—7 in FIG. 1.

The pet shelter 10 includes a plurality of support legs 13 which are disposed to lift the pet shelter from the ground. In this way, the pet in the pet shelter 10 is protected from any moisture 5 or mildew or cold or freezing temperatures on the ground. The legs 13 support a base member, generally indicated at 14 in FIG. 2, which may be made from a pair of interlocking base portions 16. Each of the base portions 16 may be provided with projections 18 and recesses 20. The projections 18 on each of the members are aligned with the recesses 20 in the other member, and correspond in configuration with the recesses 20, to interlock with the recesses in the other member in forming what may be considered to be a unitary floor. By forming the base member 14 from the pair of interlocking base portions 16, the different components forming the pet shelter 10 may be stored in a compact space when disassembled. The base portions 16 may be provided at their corners with detents such as recesses 20 (FIGS. 3 and 4).

A plurality of panels extend from the base member 16. Three (3) of the panels are indicated at 24 in FIG. 2 and may be substantially identical. Each of the panels 24 may have a configuration in which the side panel slopes progressively from the bottom wall toward the top wall so that the top wall is shorter than the bottom wall. A fourth panel 26 may also be provided with the same general configuration as the panels 24. However, the panel 26 is provided with an opening 28 to define an entrance for the pet into the pet shelter 10 or an exit for the pet from the pet shelter. A shroud 30 extends from the opening 28 to provide protection for the pet from the atmosphere as the pet enters into the pet shelter 10 or leaves the pet shelter.

Each of the panels 24 and 26 is provided near its bottom end with detents which cooperate with the detents in the base member 14 to retain the panel in a fixed, but removable, relationship on the base member. For example, when the detents on the base member 14 constitute the slots 20, the detents near the bottom of the panels 24 and 26 may constitute hooks 31 which extend into the slots 20 to couple the panels to the base member. The hooks 31 may be shaped to extend into the slots 20 and securely engage the base member 14 when the panels are tilted toward one another and toward the panel 26.

Figure 2:
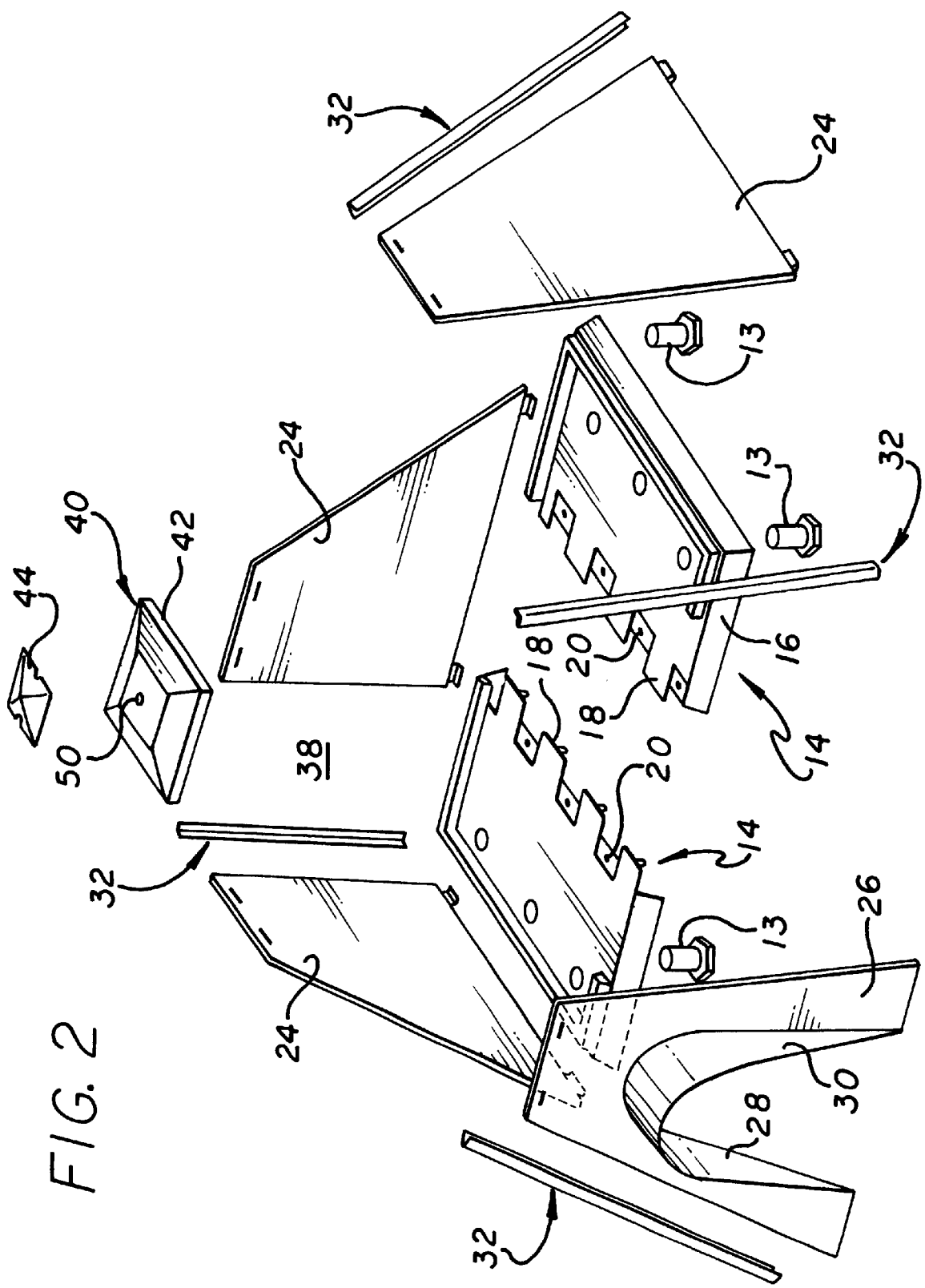
FIG. 2 is an exploded perspective view of the different components in the preferred embodiment of the pet shelter, as seen from substantially the same position as the showing in FIG. 1.

Locking rails generally indicated at 32 in FIGS. 2 and 5 lock the contiguous ends of pairs of adjacent panels 24 and 26 in a fixed relationship to each other. Each locking rail 32 extends downwardly from the upper ends of the panels 24 and 26 to the base member 14. Sockets defining guides 34 are provided in each of the locking rails 32 to receive the contiguous ends of the adjacent panels 24 and 26 and hold the adjacent panels in a fixed relationship to each other. The locking rails 32 extend into sockets 36 in the base member 14.

When it is desired to disassemble the pet shelter 10, the hooks 37 in the locking rails 32 may be removed from the sockets 36 in the base member 14. The locking rail 32 may then be slid upwardly to disengage the panels 24 and 26 from the guides 34 in the locking rails. In this way, the panels 24 and 26 can be disassembled and stacked in a pile for easy transportation in an automobile and for storage in a confined area in a pet owner's basement, garage or attic.

When the panels 24 are tilted toward one another and toward the panel 26 and the panels become fixedly positioned relative to one another by the locking rails 32, an opening 38 (FIG. 2) is provided at the upper ends of the panels. A cap structure generally indicated at 40 is disposed in the opening 38. The cap structure may be considered to include a top cap 42 and a vent cap 44.

The top cap 42 (FIG. 6) fits snugly on the panels 24 and 26 over the opening 38. The top cap 38 may be locked to the panels 24 and 26 by mating detents in the top cap and the panels. For example, the panels 24 and 26 may be provided with female detents such as notches 46 (FIG. 6) at spaced positions near the tops of the panels. Male detents such as tangs 48 may be provided on the top caps 42 to mate with the notches 46 in the panels 24 and 26 and hold the top cap in a fixed relationship with the panels. The intercoupled relationship between the top cap 42 and the panels 24 and 26 is such that the top cap may be easily removed from the panels when it is desired to disassemble the pet shelter 10.

The top cap 42 has an opening 50 (FIG. 7) which receives a retainer 52 in the vent cap 44 in a snug relationship. The retainer 52 is provided with a substantially v-shaped cut 54 to define a pair of spaced spring arms 56. The spring arms 56 may be pressed toward each other to insert the retainer 52 into the opening 50 in the top cap 42 or to remove the retainer from the opening. Lugs 58 extend outwardly from the spring arms 56 at the bottom of the spring arms to maintain the retainer 52 in the opening 50 until the spring arms 56 are pressed toward each other.

The vent cap 44 includes a cover 58 which is disposed on the retainer 52 in integral relationship with the retainer. The cover 58 has dimensions which are greater than the dimensions of the top cap 42. The cover 58 is shaped to seal the top cap 42 when the cover rests on the top cap 42. This is shown in solid lines in FIG. 7. Because of this, when the cover 48 rests on the top cap 42, it prevents air from flowing from the atmosphere through the opening 50 into the enclosure defined by the pet shelter 10 or from the pet shelter through the opening into the atmosphere. When the vent cap 42 is raised upwardly from the top cap 42 as shown in broken lines in FIG. 7, a passage 60 is produced for the flow of air through the opening 50 in the top cap 42 into or out of the enclosure defined by the pet shelter 10. The size of the passage 60 may be varied by moving the retainer 52 upwardly or downwardly in the opening 50.

The different parts of the pet shelter 10 may be made in accordance with the disclosures in any one or more of the following patents:

| U.S. PAT. NOS. | DATE OF ISSUANCE | INVENTOR(S) |
| --- | --- | --- |
| 3,436,446 | APRIL 1, 1969 | RICHARD G. ANGELL, JR. |
| 3,876,566 | APRIL 8, 1975 | JAMES A. KOSHAK et al. |
| 3,988,403 | OCTOBER 26, 1976 | RICHARD W. ANGELL et al. |
| 4,229,395 | OCTOBER 1, 1980 | TADUSHI NAGUMO, et al. |

-continued

| U.S. PAT. NOS. | DATE OF ISSUANCE | INVENTOR(S) |
|---|---|---|
| 4,384,032 | MAY 17, 1983 | HISAO TASHIRO et al. |
| 4,629,650 | DECEMBER 16, 1986 | HIROSHI KATAOKA |
| 4,769,397 | SEPTEMBER 6, 1988 | ROBERT M LAPIERRE et al. |
| 4,827,872 | MAY 9, 1989 | WILLIAM R SOMMERS |

In accordance with the disclosures in any one or more of the patents listed above, the different parts of the pet shelter 10 may be molded from a thermoplastic polymeric material as for example polymers and copolymers of olefinically unsaturated compounds and their derivatives such as polyethylene, polypropylene, polystyrene, acrylonitrile-butadiene-styrene polymers, vinyl resins, nylons, polycarbonates, polyhydroxyethers, polyarylene polyethers and the like.

The mixture employed in the process can also contain conventional molding additives such as heat and light stabilizers, pigments, mold release agents and slip agents. A conventional nucleating agent such as calcium silicate may be added to the mixture to enhance the uniformity of the cells produced by the foaming action. The ingredients of the mixture can be premixed, if desired, and charged to an extruder wherein the thermoplastic material is fluxed and mixed.

A blowing agent can be selected from chemical compounds such as azo, N-nitroso, carbonate and sulfony hydrazide compounds which are heat decomposable to yield a gas such as carbon dioxide or nitrogen. The blowing agent can also consist of normally gaseous agents such as methyl chloride, propylene, butylene and gaseous fluorocarbons, as well as gases such as nitrogen, carbon dioxide or air. Volatile liquids such as pentane, water and liquid fluorocarbons can also be employed in the foaming of the polymer.

A charge of a thermoplastic material such as polyethylene is initially introduced into an extruder. The charge of the polyethylene only partially fills the mold cavity. A blowing agent such as nitrogen is also introduced into the extruder and is mixed with the charge of polyethylene to obtain a uniform mixture of the polyethylene charge and the nitrogen in the extruder. The mixture is extruded at a temperature above the foaming temperature of the nitrogen and at a pressure above the foaming pressure of the nitrogen. The mixture is introduced to an expandible accumulation chamber which is in continuous communication with the extruder and is adapted to receive the mixture from the extruder and to maintain the mixture in the accumulator in the molten state and at a pressure above the pressure of the nitrogen foaming agent.

A mold is pted to be maintained as a pressure no greater than the pressure at which the mixture foams and expands. Communication is established between the chamber and the mold, and the mixture is rapidly forced out of the chamber and into the mold. The pressure difference between the chamber and the mold causes the mixture to expand rapidly in the mold. The mold is maintained at a temperature below the melting temperature of the thermoplastic material. Communication is terminated between the mold and the chamber at a point where the pressure is above the foaming pressure of the mixture. The mixture is removed between the point and the mold after terminating communication between the mold and the chamber.

When the pressure of the mixture in the mold is low, the charge expands to form a material indicated generally at 62 in FIG. 9. This material includes relatively dense outer layers 64 which have high length-to-weight ratios. The material also includes a foamed core material 66 between the outer layers 64. The core material 66 is continuous or integral with the outer layers 64. This causes the material 62 to be tough and strong. Since the core material 66 is foamed, it provides a heat insulation against hot and cold temperatures in the atmosphere outside of the pet shelter 10. This causes the pet within the shelter 10 to be relatively comfortable even when extreme temperatures exist in the atmosphere outside of the pet shelter.

The preferred embodiment 12 (FIG. 8) may be made from the same material as the preferred embodiment 10. The preferred embodiment 12 may include a base member 70 corresponding to the base member 14 in the preferred embodiment. The base member 70 may be disposed on legs 71. The preferred embodiment may also include a single member 72 which comprises panels corresponding to the panels 24 and 26 in the preferred embodiment 10 and which also comprises a top cap 73 corresponding to the top cap 42 in the preferred embodiment 10 shown in FIGS. 1–7. It may further include a vent cap 74 corresponding to the vent cap 44 in the preferred embodiment 10 shown in FIGS. 1–7. The vent cap 74 is adjustable in position in an opening in the top cap 73 in a manner similar to that described above for the adjustable positioning of the vent cap 44 in the preferred embodiment 10.

The preferred embodiment 12 is advantageous in that it provides for an adjustable opening between the top cap 72 and the vent cap 74 in a manner similar to that described above for the preferred embodiment 10. The preferred embodiments 12 is also advantageous in that it is formed from a minimal number of parts. This minimizes the number of parts that have to be assembled to provide a completed unit. However, the preferred embodiment 12 cannot be assembled and disassembled, in the manner described above for the pet kennel 10, to provide a knock-down relationship for storing the disassembled parts in a minimal space.

Although this invention has been disclosed and illustrated with reference to particular preferred embodiments, the principles involved are susceptible for use in numerous other embodiments which will be apparent to persons of ordinary skill in the art. The invention is, therefore, to be limited only as indicated by the scope of the appended claims.

What is claimed is:

1. A pet shelter, including,
    a plurality of panels, one of the panels having an opening defining an entrance and an exit for the pet, the panels having upper and lower ends,
    a base member disposed relative to the panel for receiving and retaining the panels at the lower ends of the panels,
    the panels being tiltable toward one another at their upper ends to define an enclosure for the pet shelter,
    detents in the base member and at the lower ends of the panels for locking the panels to the base member in the tilted relationship of the panels, and
    a plurality of locking rails each coupled to an individual one of an adjacent pair of the panels in the tilted relationship of the panels to lock the panels to one another.

2. A pet shelter as set forth in claim 1, including,
    a top cap operatively coupled to the panels at the upper ends of the panels in the tilted relationship of the panels to define a roof for the pet shelter.

3. A pet shelter as set forth in claim 2, including,
    a vent cap mounted in the top cap to define an opening in the roof for the circulation of air into, through and out of the pet shelter.

4. A pet shelter as set forth in claim 3 wherein
the vent cap is slidably mounted on the top cap to define an adjustable opening in the roof for the circulation of air into, through and out of the pet shelter.

5. A pet shelter as set forth in claim 1 wherein
the panels and the base member are made from a material having dense outer layers and a foamed core disposed between the outer layers and integral with the outer layers.

6. A pet shelter, including,
a plurality of panels tiltably disposed in adjacent relationship to one another in pairs to provide an enclosure defining the pet shelter, one of the panels having an opening defining an entrance and an exit for the pet shelter,
locking rails operatively coupled to each pair of adjacent panels at upper ends of the panels to retain the panels in the tilted relationship for maintaining the enclosure, and
a cap structure operatively coupled to the panels at the upper ends of the panels for providing a roof for the pet shelter and for providing an opening in the roof for the circulation of air between the interior and exterior of the pet shelter.

7. A pet shelter as set forth in claim 6 wherein
the cap structure is adjustably disposed relative to the panels at the upper ends of the panels to vary the size of the opening in the pet shelter for the circulation of air between the interior and exterior of the pet shelter.

8. A pet shelter as set forth in claim 7 wherein
the cap structure includes a member which extends over the roof in one position of the member to close the opening in the roof and to provide the opening in other positions of the member.

9. A pet shelter as set forth in claim 6 wherein
the cap structure includes a top cap operatively coupled to the panels at the upper ends of the panels to define a roof for the pet shelter and to define an opening in the roof and includes a vent cap adjustably disposed in the opening in the vent cap to define, and vary the size of, the opening for the circulation of air between the interior and exterior of the pet shelter.

10. A pet shelter as set forth in claim 9 wherein
the top cap and the panels have male and female detents which engage each other to interlock the top cap and the panels.

11. A pet shelter as set forth in claim 6 wherein
the panels and the cap structure are made from a material having dense outer layers and a foamed core disposed between the outer layers and integral with the outer layers.

12. A pet shelter as set forth in claim 6, including,
a base member having openings at spaced positions on the base member, the base member being disposed to support the panels, and
detents at the lower ends of the panels for disposition in the openings in the base member for an interlocking relationship between the base member and the panels when the panels are tilted toward one another at the upper ends of the panels.

13. A pet shelter as set forth in claim 9, wherein
a member is adjustably disposed in the cap structure relative to the panels at the upper ends of the panels to vary the size of the opening in the pet shelter for the circulation of air between the interior and exterior of the pet shelter,
a base member is provided with openings at spaced positions on the base member, the base member being disposed to support the panels, and
detents are provided at the lower ends of the panels for disposition in the openings in the base member for an interlocking relationship between the base member and the panels when the panels are tilted toward one another at the upper ends of the panels.

14. A pet shelter, including,
a plurality of panels disposed relative to one another to define an enclosure for the pet, one of the panels having an opening for the entrance of the pet into the enclosure and the exit of the pet from the enclosure,
a roof having an opening, and
a vent cap adjustably disposed in the roof opening for movement in a vertical direction relative to the roof and constructed to provide a passage for the flow of air into, through and out of the opening.

15. A pet shelter as set forth in claim 14 wherein
the vent cap is provided with a detent constructed to provide for an insertion of the vent cap into the opening in the roof and to retain the vent cap in the opening in the roof after such insertion.

16. A pet shelter as set forth in claim 14 wherein
the panels, the roof and the vent cap are made from a material having dense outer layers and a foamed core unitary with the dense outer layers and disposed between the dense outer layers.

17. A pet shelter as set forth in claim 14, including,
a base member for disposition relative to the bottom of the panels to support the panels, and
a detent relationship between the base member and the panels to retain the panels in a fixed position relative to the base member.

18. A pet shelter as set forth in claim 14 wherein
the panels are disposed relative to one another in a unitary relationship to define the enclosures and the roof with the opening in the roof.

19. A pet shelter as set forth in claim 14 wherein
the panels are paired in adjacent relationship to each other and wherein
the panels are individual and are coupled to one another by locking rails each disposed between a pair of the adjacent panels and each constructed to receive and retain in a fixed relationship the coupled panels in the pair.

20. A pet shelter as set forth in claim 18, including,
the vent cap being provided with a detent constructed to provide for an insertion of the vent cap into the opening in the roof and to retain the vent cap in the opening in the roof after such insertion,
a base member for disposition relative to the bottom of the panels to support the panels, and
a detent relationship between the base member and the panels to retain the panels in a fixed relationship to the base member.

21. A pet shelter as set forth in claim 19, including,
the vent cap being provided with a detent constructed to provide for an insertion of the vent cap into the opening in the roof and to retain the vent cap in the opening in the roof after such insertion,
a base member for disposition relative to the bottom of the panels to support the panels, and
a coupling between the base member and the panels to retain the panels in fixed relationship to the base member.

22. In a pet shelter, the combination of a plurality of panels each having upper and lower ends and each disposed relative to the other panels to become tilted inwardly at their upper ends toward one another to a position defining a multi-sided enclosure formed by adjacent pairs of panels, and a plurality of locking rails each disposed between an individual pair of adjacent panels in the multi-sided enclosure to retain the panels in the adjacent pair in a locked relationship when the panels are tilted inwardly toward one another.

23. In a pet shelter as set forth in claim 22, a cap disposed on the panels at the upper ends of the panels and defining a roof for the pet shelter.

24. In a pet shelter as set forth in claim 23, detents on the cap and the panels at the upper ends of the panels for becoming interlocked to retain the cap structure in a particular relationship on the panels in the tilted relationship of the panels, the cap constituting a top cap, and a vent cap disposed on the vent cap for defining an opening in the roof for the passage of air into and out of the pet shelter.

25. In a pet shelter as set forth in claim 22, detents in the base member and the panels at the lower ends of the panels for becoming interlocked to cooperate with the locking rails in retaining the panels on the base member in the tilted relationship of the panels.

26. In a pet shelter as set forth in claim 22, a cap structure including a top cap having detents for becoming interlocked with detents on the panels in the tilted relationship of the panels to retain the cap structure in a particular disposition on the panels in the tilted relationship of the panels and to define a roof for the pet shelter, the top cap having an opening, the cap structure also including a vent cap disposed in the opening in the top cap in spaced relationship to the top cap for providing for a passage of air between the inside of the pet shelter and the outside of the pet shelter.

27. In a pet shelter as set forth in claim 26, detents in the base member and the panels at the lower ends of the panels for becoming interlocked to cooperate with the locking rails in retaining the panels on the base member in the tilted relationship of the panels.

28. A pet shelter as set forth in claim 26 wherein a top cap is disposed on the panels with the panels in the tilted relationship to define a roof and wherein the panels are individual and are paired to define the enclosure and wherein the panels in each pair are disposed in an adjacent and tilted relationship and wherein the tilted panels in the adjacent pairs are retained in a fixed interrelationship by locking rails each operatively coupled to the panels in an individual one of the pairs.

29. A pet shelter as set forth in claim 28 wherein the panels are made from a material having dense outer layers and a foamed core integral with, and disposed between, the dense outer layers.

30. A pet shelter as set forth in claim 28 wherein the top cap has an opening and wherein a vent cap is adjustably positioned in the opening in the top cap to provide a passage for a flow of air through the passage and the opening into the enclosure and out of the enclosure.

31. In a pet shelter as set forth in claim 22, the panels being made from a material having dense outer layers and a foamed core disposed between, and integral with, the dense outer layers.

32. A pet shelter, including, a base member, an enclosure formed from a plurality of panels, one of the panels having an opening providing for an entrance of the pet into the enclosure and an exit of the pet from the enclosure, there being male detents on one of the base member and the panels, there being female detents on the other of the base member and the panels, the male and female detents being constructed to provide an interlocking relationship between the male detents and the female detents, the panels being disposed on the base member with the male detents and the female detents in the interlocking relationship.

33. A pet shelter as set forth in claim 29 wherein the panels are flat and are tilted toward one another to define the enclosure and wherein the male and female detents are constructed to facilitate the interlocking interrelationship between the male and female detents when the panels are disposed in the tilted relationship.

34. A pet shelter as set forth in claim 33, including, a top cap disposed on the panels with the panels in the tilted relationship to define a roof.

35. A pet shelter as set forth in claim 34, including:

the top cap having an opening, and a vent cap adjustably positioned on the top cap to provide a passage for a flow of air through the passage and the opening into the enclosure and out of the enclosure.

36. A pet shelter as set forth in claim 32 wherein a top cap is disposed on the panels with the panels in the tilted relationship to define a roof and wherein the panels defining the enclosure and the top cap defining the roof have a unitary structure.

37. A pet shelter as set forth in claim 36 wherein the top cap has an opening and wherein a vent cap is adjustably positioned in the opening in the top cap to provide a passage for a flow of air through the passage and the opening into the enclosure and out of the enclosure.

38. A pet shelter as set forth in claim 36 wherein the panels and the top cap are made from a material having dense outer layers and a foamed core disposed between, and integral with, the dense outer layers.

39. A pet shelter, including, a plurality of separate panels disposed in an assembled relationship to one another for disassembly into the separate panels, the panels in the assembled relationship defining an enclosure for the pet shelter, one of the panels providing an opening defining an entrance for the pet into, and an exit for the pet from, the pet shelter, and a cap disposed on the panels in an assembled relationship to the panels to provide a roof for the assembled panels and to provide for a disassembly of the cap from the assembled panels.

40. A pet shelter as set forth in claim 39, including, the separate panels and the cap being made from a material having dense outer layers and a foamed core disposed between, and integral with, the outer layers to provide the separate panels and the cap with heat insulating properties.

41. A pet shelter as set forth in claim 39, including:

the cap constituting a top cap and having an opening, and a vent cap adjustably positioned in the opening in the top cap to define a passage for the circulation of air through the passage and the opening into and out of the pet shelter, the vent cap being constructed relative to the top cap to provide for a assembly of the vent cap in the opening in the top cap and a disassembly of the vent cap from the opening in the top cap.

42. A pet shelter as set forth in claim 41 wherein the vent cap includes a cover having dimensions greater than the dimensions of the top cap and shaped to prevent air from circulating into and out of the enclosure defined by the pet shelter when the cover rests on the top cap and shaped to provide a passage when the vent cap is moved so that the cover no longer rests on the top cover.

43. A pet shelter as set forth in claim 42, including, a base member, the panels being disposed on the base member in operatively coupled relationship to the base member, the separate panels and the cap being made from a material having dense outer layers and a foamed core disposed between, and integral with, the outer layers to provide the separate panels and the cap structure with heat insulating properties.

44. A pet shelter as set forth in claim 39, including a base member, the panels being disposed on the base member in operatively coupled relationship to the base member.

45. A pet shelter, including, a base member, a plurality of separate panels disposed on the base member in a tilted relationship to one another and to the base panel and operatively coupled to the base member in the tilted relationship to define an enclosure for the pet shelter, the panels being separable from one another when the panels are displaced from the tilted relationship, one of the panels providing an opening defining an entrance into, and an exit from, the pet shelter, and a cap disposed on the panels, in removable relationship to the panels, in the tilted relationship of the panels to define a roof for the assembled panels.

46. A pet shelter as set forth in claim 45, including, the cap constituting a top cap, the top cap having an opening, the top cap being removable from the panels, and a vent cap disposed on the top cap, in removable relationship to the top cap, for adjustable positioning relative to the top cap and constructed to block the opening in the top cap in a particular adjustable positioning of the vent cap relative to the top cap and to provide for a passage of air between the atmosphere and the interior of the pet shelter upon the displacement of the vent cap from the particular adjustable positioning relative to the top cap.

47. A pet structure, as set forth in claim 46 wherein the panels and the cap are made from a material having dense outer layers and a foamed core disposed between, and integral with, the dense outer layers.

48. A pet shelter as set forth in claim 47 including locking rails each operatively coupled to a pair of panels and to the base member to lock the panels to one another and to the base member.

* * * * *

UNITED STATES PATENT AND TRADEMARK OFFICE
CERTIFICATE OF CORRECTION

PATENT NO.  : 6,318,294 B1  Page 1 of 1
DATED       : November 20, 2001
INVENTOR(S) : Edward A. Richmond and Gregory M. Richmond It is certified that error appears in the above-identified patent and that said Letters Patent is hereby corrected as shown below:

<u>Column 10,</u>
Line 23, change "29", to read -- 32 --.

Signed and Sealed this

Sixth Day of August, 2002

*Attest:*

*Attesting Officer*

JAMES E. ROGAN
*Director of the United States Patent and Trademark Office*